United States Patent Office 3,098,069
Patented July 16, 1963

3,098,069
PYRAZINE DERIVATIVES
Bruno Camerino and Giorgio Palamidessi, Milan, Italy, assignors to Società Farmaceutici Italia, Milan, Italy, a corporation of Italy
No Drawing. Filed Sept. 11, 1962, Ser. No. 222,949
Claims priority, application Great Britain July 14, 1959
16 Claims. (Cl. 260—239.7)

This application is a continuation-in-part of applications Serial No. 42,236, filed July 12, 1960, now abandoned, and Serial No. 120,933, filed June 30, 1961, now abandoned.

Our invention relates to substituted derivatives of pyrazine.

It is an object of our invention to provide a novel class of pyrazines for therapeutical use. This class of pyrazines has the following formula:

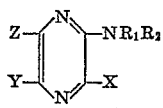

in which X is a member selected from the group consisting of $OCH_3$ and $OC_2H_5$; Y is a member selected from the group consisting of H, Br and lower alkyl; Z is a member selected from the group consisting of H and lower alkyl, when Y is Br, Z is H; $R_1$ is a member selected from the group consisting of H and lower alkanoyl; and $R_2$ is a member of the group consisting of

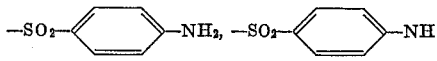

lower alkanoyl and

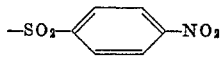

We have found that a number of sulfapyrazines provided by the present invention are therapeutically useful substances.

Processes of preparing some alkyl and dialkylsulfapyrazines are well known in literature (J. Am. Chem. Soc. 63, 1941, p. 1929, and J. Am. Chem. Soc. 67, 1945, p. 802), but as far as we know, the antibacteric activity of these compounds has not been reported. One can assume that said new products did not appear to be a remarkable technical progress in comparison with sulfapyrazine.

The process of preparing some of the compounds of the invention and their interrelationships are illustrated schematically in Table 1, columns 3 and 4.

Taking 2-amino-pyrazine (I) as the starting material for the invention, it has been found that it may be brominated to yield the new substance, 3,5-dibromo-2-amino-pyrazine (II), by reacting with bromine in the presence of an alkali or alkaline earth metal salt of a weak acid. The 2-amino-pyrazine (I) is dissolved in a suitable polar solvent such as acetic acid, with preferably not less than 2 mols of bromine, at a preferred temperature of from about —5° C. to +30° C., and advantageously in the presence of 1–3 mols of alkaline or alkaline earth salts of weak acids such as sodium acetate, calcium acetate, sodium formate and the like.

New derivatives of amino-pyrazine are prepared, of the general formula:

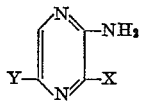

wherein X represents alkoxy, and preferably $OCH_3$ or $OC_2H_5$; and Y represents Br, H, such as 2-amino-3-methoxy-5-bromo-pyrazine (III) and 2-amino-3-methoxy-pyrazine (IV).

Compound III and higher alkoxy compounds can be obtained by reacting 3,5-dibromo-2-amino-pyrazine (II) with alkali metal alcoholates (i.e. alkali metal methylates or ethylates for $X=OCH_3$ or $OC_2H_5$) so that the bromine in the 3-position is replaced, while the bromine in the 5-position does not react and remans unaffected.

To make compound IV and higher alkoxy compounds the bromine in the 5-position can be replaced by a hydrogen atom, namely by hydrogenation in the presence of a catalyst such as palladium on charcoal. In some cases an alkali or tertiary amine, such as sodium or potassium hydroxide or triethylamine is also present, advantageously.

The resulting compound may be condensed with a p-acylamino-benzenesulphonyl halide in a solvent such as pyridine, in some instances mixed with acetone, and upon hydrolyzing the resulting acylamino compounds with alkali the 3 and 3,5-substituted sulphapyrazines defined in the above general formula are produced.

Alternatively, 2-amino-3-methoxy-pyrazine (IV) may be manufactured from pyrazine derivatives, having the following general formula:

where T represents $CONH_2$, CN, $NH_2$; and U represents OH, Cl, $OCH_3$, but in which, when T is $NH_2$, U is not $OCH_3$. A compound of said formula in which $T=CONH_2$ or CN is treated to give the compound in which $T=NH_2$, before or after the compound in which $U=OH$ or Cl is treated to give the compound in which $T=OCH_3$.

If 2-carboxy-amido-3-hydroxy-pyrazine (Ia) is taken as the starting material, it may be treated with phosphorus oxychloride ($POCl_3$) to produce 2-cyano-3-chloro-pyrazine (IIa), which may be treated with an alkali metal alcoholate, such as sodium methylate, to yield 2-cyano-3-methoxy-pyrazine (IIIa). The latter in turn may be treated with alkaline hydrogen peroxide to give 2-carboxyamino-3-methoxy-pyrazine (IVa), which in its turn may be treated with an alkali metal hypobromite, such as NaOBr or KOBr, to give the key intermediate 2-amino-3-methoxy-pyrazine (IV). If any of the intermediate (Ia)–(IVa) is taken as the starting material, the key intermediate 2-amino-3-methoxy-pyrazine (IV) may be prepared by effecting or carrying out the steps in the process which are between the starting material and the product (IV).

Alternatively, 2-amino-3-methoxy-pyrazine (IV) may be prepared from 2-amino-3-chloro-pyrazine (VIIa) by the action of an alkali metal methylate, such as sodium methylate.

Compounds of the general formula of the invention in which X is $OCH_3$ or $OC_2H_5$, $R_1$ is hydrogen or acyl and $R_2$ is $-SO_2C_6H_4-NH_2$, $-SO_2-C_6H_4NHAc$ or $$-SO_2C_6H_4-NO_2$$

may be prepared by condensing 2-amino-pyrazines of the general formula of the invention in which $R_1$ and $R_2$ are H, such as 2-amino-3-methoxy-pyrazine (IV), with a p.nitro-benzene-sulphonyl-halide, e.g. with p-nitro-benzene-sulphonyl-chloride and splitting off hydrogen halide, the reaction being carried out in a solvent such as pyridine, in some instances preferably in admixture with organic solvents such as acetone. The $N_1$-position may be then acylated, e.g. with acetic anhydride in the presence of tertiary amines such as pyridine, and finally the nitro group may be hydrogenated. The direct acylation

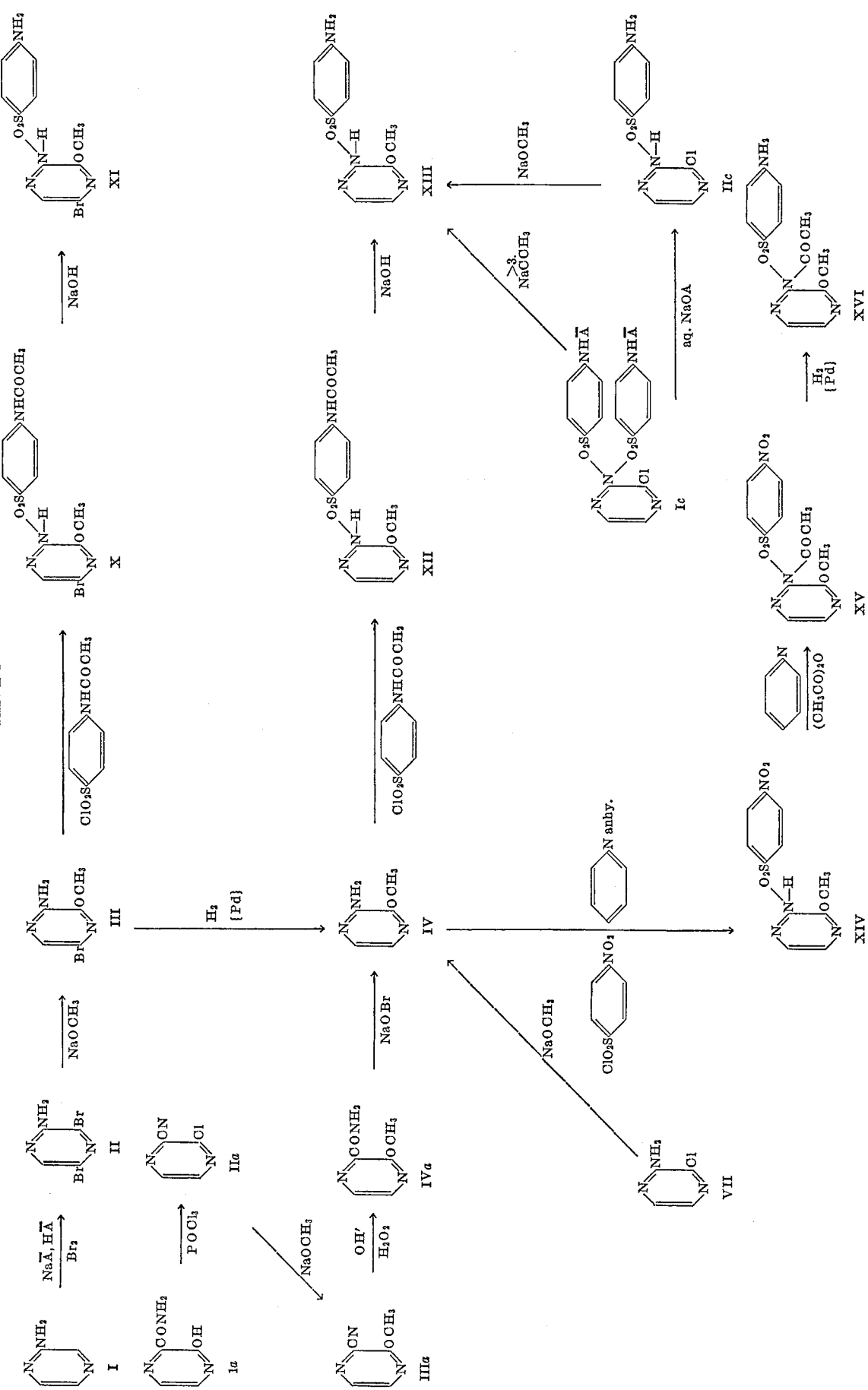

of the resulting hydrogenated sulphapyrazine yields the corresponding $N_1$, $N_4$-diacylated-sulphapyrazine.

We have found that 3-methoxy-2-sulphapyrazine (XIII) may be manufactured from sulphapyrazine derivatives having the following general formula:

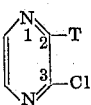

where

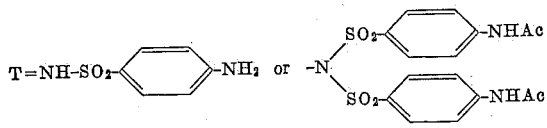

The process of the present invention can be effected as follows: The transformation of the bis-p-acetylamino-benzenesulphonamide group in 2-position into p-aminobenzenesulphonamido group is carried out by treatment with an aqueous (boiling 10–20%) solution of an alkali metal hydroxide such as sodium hydroxide at an elevated temperature, preferably at boiling point. Preferably the solution has a concentration of 10–20% by weight. Under these conditions, the chloro group present in 3-position does not react, and is unaffected. The conversion of the chloro group in 3-position to the methoxy group is carried out with an alkali metal methylate such as sodium methylate at a temperature of 90°–130° C., preferably at 100°–110° C. The simultaneous transformation of the bis-p-acetylamino-benzenesulphonamido group into p-aminobenzenesulphonamido group and the conversion of chloro group to methoxy group is obtained by reaction with preferably at least three mols of an alkali metal methylate, such as sodium methylate, at a preferred temperature range of from 100° to 140° C.

2-(bis-p-acetylamino-benzenesulphonamido)-3-chloropyrazine (Ic), prepared according to the procedure described by F. G. McDonald and R. C. Ellingson in J.A.C.S. 69, 1947, page 1034, is transformed into 2-p-aminobenzenesulphonamido-3-chloropyrazine (IIc) by reaction with an aqueous 10–20% solution of sodium hydroxide at the boiling point for some hours. 2-p-aminobenzenesulphonamido-3-chloropyrazine (IIc), which may be prepared also according to the process described in British Patent No. 612,385, is converted to 2-p-aminobenzenesulphonamido-3-methoxy-pyrazine (XIII) by action of 2 mols of sodium methylate at 100–110° C. for some hours. 2-p-aminobenzene sulphonamido-3-methoxy-pyrazino (XIII) may be directly obtained from (Ic) by reaction with at least 3 mols of sodium methylate at 100–140° C. for some hours.

The invention thus makes possible the synthesis of a new series of therapeutically valuable sulphapyrazine derivatives. These new products are useful particularly in the therapy of bacterial infections caused by staphylococcus or streptococcus or pneumococcus or other microbial agents.

The invention is illustrated by the following examples, which illustrate preferred embodiments, and are not intended to limit the invention:

*Example 1*

2-AMINO-3,5-DIBROMO-PYRAZINE (II)

112.7 ml. of bromine in 375 ml. of acetic acid are slowly added at 0° to +2° C., while stirring, to a solution of 95.11 g. of 2-amino-pyrazine and 326.5 g. of acetic acid trihydrate ($CH_3COONa.3H_2O$) in 1480 ml. of acetic acid. This addition requires about 2–3 hours and it is carried out in the dark. The mixture is then allowed to stand at room temperature (25°–30° C.) for 15–16 hours. About 1.5 liters of acetic acid are distilled off under vacuum (12–14 mm. Hg) at 35° C. and the brown and viscous residue is poured into 500 g. of ice-water under stirring.

Aqueous 20% sodium hydroxide is added in order to obtain a pH=8 and then the product is filtered and air-dried. The air-dried product is extracted 6 times with 150 ml. of ether; the filtered ethereal solutions are evaporated to dryness and the residue (50–52 g.) is crystallized from hot water.

Yield: 34.36 g. of II melting at 114° C.

*Example 2*

2-AMINO-3-METHOXY-5-BROMO-PYRAZINE (III)

7. g. of 2-amino-3,5-dibromo-pyrazine (II) are boiled for 9 hours in a methanolic solution of sodium methylate (obtained from 0.65 g. of Na and 18.5 ml. of methanol). By cooling a crystalline product is obtained, filtered and washed once with methanol and 2–3 times with water.

Yield: 5.4 g. of III melting at 138° C.

Other corresponding 3-alkoxy compounds, such as the 3-ethoxy compound, are prepared in similar manner.

*Example 3*

2-AMINO-3-METHOXY-PYRAZINE (IV)

3 g. of 2-amino-3-methoxy-5-bromo-pyrazine (III) are hydrogenated, in methanolic solution at room temperature and at atmospheric pressure, in the presence of 1 g. of palladium over charcoal (10%) and 0.9 g. of potassium hydroxide. When the stoichiometric amount of hydrogen is absorbed, the suspension is filtered and the filtrate is evaporated to dryness. The residue is extracted with acetone; the acetonic solution is evaporated and the residue (1.8 g. of raw IV melting at 75°–82° C.) is crystallized from cyclohexane.

Yield: 1.5 g. of pure IV, melting at 85° C.

Other corresponding 3-alkoxy compounds, such as the 3-ethoxy compound, are prepared in similar manner.

*Example 4*

2-(p-ACETYLAMINE-BENZENE-SULPHONAMIDO)-3-METHOXY-5-BROMOPYRAZINE (X)

2.9 g. of p-acetylamino-benzenesulphonyl chloride are added in small portions in about 30 minutes to a solution of 2.5 g. of 2-amino-3-methoxy-5-bromo-pyrazine (III) in 30 ml. of anhydrous pyridine. The solution is allowed to stand for 20 hours at room temperature and then the mixture is heated at 60° C. for 6 hours. About 25 ml. of pyridine is distilled off under vacuum and the residue is poured into 40 g. of ice-water under stirring. The product is filtered, washed with water and dried.

Yield: 3.7 g. of X melting at 215°–220° C. The M.P. of pure X (crystallized from water-alcohol) is 230°–233° C.

Other corresponding 3-alkoxy compounds, such as the 3-ethoxy compound, are prepared in similar manner.

*Example 5*

2-SULPHANILAMIDO-3-METHOXY-5-BROMO-PYRAZINE (XI)

2.14 g. of X and 10 ml. of 10% aqueous sodium hydroxide are boiled for 1 hour. The cooled solution is slightly (pH=6) acidified with 2 N hydrochloric acid and the precipitate is filtered, washed with water and dried.

Yield: 1.7 g. of XI melting at 208°–212° C. The M.P. of pure XI (crystallized from alcohol) is 212°–213° C.

Other corresponding 3-alkoxy compounds, such as the 3-ethoxy compound, are prepared in similar manner.

*Example 6*

2-(p-ACETYLAMINOBENZENE-SULPHONAMIDO)-3-METHOXY-PYRAZINE (XII)

1.5 g. of 2-amino-3-methoxy-pyrazine (IV) dissolved in 15 ml. of anhydrous pyridine are treated, under cooling and stirring, with 2.81 g. of p-acetylamino-benzenesulphonyl-chloride, at small portions in about 30 minutes. The mixture is allowed to stand for 20 hours at room temperature and then is heated to 50° C. for 4 hours. The solution is concentrated to one third of its volume, under vacuum, and poured into ice-water under stirring. The precipitate is filtered and washed with water. 2.21 g. of XII melting at 218°–220° C. are obtained. The M.P. of pure XII (crystallized from alcohol) is 224° C.

Other corresponding 3-alkoxy compounds, such as the 3-ethoxy compound, are prepared in similar manner.

*Example 7*

2-SULPHANILAMIDO-3-METHOXY-PYRAZINE (XIII)

1.5 g. of XII and 7–8 ml. of aqueous 10% sodium hydroxide are boiled for 1 hour. The cooled solution is slightly acidified (pH=6) within aqueous 2 N hydrochloric acid and the product is filtered.

Yield: 1.25 g. of XIII melting at 175° C.

Other corresponding 3-alkoxy compounds, such as the 3-ethoxy compound, are prepared in similar manner.

*Example 8*

2-CYANO-3-CHLORO-PYRAZINE (IIa) FROM (Ia)

A mixture of 20 g. of 2-carboxyamido-3-hydroxy-pyrazine (prepared according to F. L. Muehlmann and A. R. Day procedure described in J. Am. Chem. Soc. 78, 1956, page 252) and 85 ml. of phosphorus oxychloride ($POCl_3$) is slowly heated to 100° C. The reaction begins at about 80–90° C. with development of hydrogen chloride. The solution is kept at 100° C. for two hours. The solution is then cooled to room temperature and slowly poured into ice-water. The product is extracted with chloroform, the organic extract is evaporated to dryness under vacuum and a crystalline residue of 14 g. of (IIa), melting at 48° C. is obtained.

*Example 9*

2-CYANO-3-METHOXY-PYRAZINE (IIIa) FROM (IIa)

19 g. of 2-cyano-3-chloro-pyrazine (IIa) are added at room temperature to a methanolic solution of sodium methylate (obtained from 3.13 g. of metallic sodium and 75 ml. of anhydrous methanol). An exothermic reaction takes place with a precipitation of sodium chloride. The suspension is boiled for 2–3 hours, then filtered and the precipitate of sodium chloride is washed with methanol. Acetic acid is added (if it is necessary) in order to have a neutral pH and the methanolic solution is evaporated to dryness under vacuum. Cool water is added to the residue and the product is filtered. 16.5 g. of (IIIa) melting at 56° C. are obtained.

Other corresponding 3-alkoxy compounds, such as the 3-ethoxy compound, are prepared in similar manner.

*Example 10*

2-CARBOXYAMIDO-3-METHOXY-PYRAZINE (IVa) FROM (IIIa)

A mixture of 10 g. of (IIIa) and 140 ml. of aqueous 5% hydrogen peroxide, which has been alkalinized with 2 N sodium hydroxide to pH=9, is warmed and kept at 50–55° C. for 4 hours under stirring. The mixture is then cooled and extracted with chloroform. The extract is evaporated to dryness: 9 g. of (IVa) melting at 146° C. are obtained.

Other corresponding 3-alkoxy compounds, such as the 3-ethoxy compound, are prepared in similar manner.

*Example 11*

2-AMINO-3-METHOXY-PYRAZINE (IV) FROM (IVa)

5.4 g. of 2-carboxyamido-3-methoxy-pyrazine (IVa) are added to an aqueous solution of sodium hypobromite, obtained by adding 1.93 ml. of bromine to a solution of 11.86 g. of potassium hydroxide in 140 ml. of water at 0° C. The mixture is stirred 2 hours at 80° C., then it is evaporated under vacuum to a small volume. Hydrogen chloride is added until the mixture becomes acid. After 10–20 minutes, the solution is made alkaline with concentrated ammonia to a pH=9 and the product (IV) is extracted with chloroform. After evaporating the chloroform, 3.13 g. of (IV) melting at 84–85° C. are obtained.

Other corresponding 3-alkoxy compounds, such as the 3-ethoxy compound, are prepared in similar manner.

*Example 12*

2-AMINO-3-METHOXY-PYRAZINE (IV) FROM (VIIa)

70 mg. of 2-amino-3-chloro-pyrazine (prepared according to F. L. Muehlmann and A. R. Day procedure described in J. Am. Chem. Soc. 78, 1956, page 243) are added to a methanolic solution of sodium methylate (stoichiometric amount) at room temperature. The solution is boiled for 12 hours, then sodium chloride is filtered and the filtrate is evaporated under vacuum. The residue is treated with cold water, filtered and washed with water. The product (IV) melting at 85° C. is obtained in theoretical yield.

Other corresponding 3-alkoxy compounds, such as the 3-ethoxy compound, are prepared in similar manner.

*Example 13*

2-(p-NITROBENZENE-SULPHONAMIDO)-3-METHOXY-PYRAZINE (XIV)

44.4 g. of p-nitrobenzenesulphonyl chloride are added, during 20–30 minutes, to a solution of 25 g. 2-amino-3-methoxy-pyrazine (IV) dissolved in 200 ml. anhydrous pyridine, cooled at 0° C. The mixture is then stirred for 24 hours at room temperature. The solution is heated to 60° C. and kept at this temperature for 8–10 hours. The reaction mixture is then concentrated under vacuum to a third of its original volume and slowly poured into 500 ml. of ice-water with stirring. The product is filtered and washed with water (50 g., M.P. at 183–186° C.). The pure product (XIV) crystallized from alcohol-acetone melts at 197° C.

Other corresponding 3-alkoxy compounds, such as the 3-ethoxy compound, are prepared in similar manner.

*Example 14*

2-($N_1$-ACETYL-p-NITROBENZENE-SULPHONAMIDO)-3-METHOXY-PYRAZINE (XV)

38 g. of (XIV) are added to a mixture of 83 ml. of pyridine and 33.5 ml. of acetic anhydride. The solution is kept at 95° C. for 45–60 minutes and poured into 400 ml. of ice-water under stirring. The product is filtered, washed at first with cooled diluted aqueous sodium hydroxide and then with water to neutrality.

Yield: 40 g. melting at 175–185° C.

The pure product (XV) crystallized from alcohol-acetone melts at 187° C.

Other corresponding 3-alkoxy compounds, such as the 3-ethoxy compound, are prepared in similar manner.

*Example 15*

2-($N_1$-ACETYL-SULPHANILAMIDO)-3-METHOXY-PYRAZINE (XVI)

7 g. of (XV) dissolved in 120 ml. of dioxane are hydrogenated at room temperature and atmospheric pressure under stirring, in the presence of 5 g. of 10% palladium over charcoal. After 8–9 hours the hydrogenation is over. The catalyst is filtered and the filtrate is evaporated to dryness under vacuum. The residue is crystallized from acetone: 1.5 g. of pure product (XVI), melting at 199° C. are obtained.

By concentration of the mother-waters, another 1.5 g. of product (XVI) melting at 190–195° C. are recovered.

Other corresponding 3-alkoxy compounds, such as the 3-ethoxy compound, are prepared in similar manner.

*Example 16*

2-p-AMINOBENZENESULPHONAMIDO-3-CHLORO-PYRAZINE (IIc) FROM (Ic)

A mixture of 26 g. of 2-(bis p-acetylaminobenzene-sulphonamido)-3-chloro-pyrazine (Ic) and 10.4 g. of NaOH in 70 ml. of water, is heated for two hours. The solution is cooled, decolorized and acidified with acetic acid. The product (IIc) is filtered and dried.

M.P.=156–158° C. Yield: 75%.

Example 17

3-METHOXY-SULPHAPYRAZINE (XIII) FROM (IIc)

A mixture of 6 g. of 2-p-aminobenzenesulphonamido-3-chloro-pyrazine (IIc) and 1.2 g. of sodium dissolved in 100 ml. of methanol, is heated at 110° C. for 15 hours. The solution is cooled, neutralized, concentrated and the residue is then treated with water and acetic acid. The product (XIII) is filtered and dried.

M.P.=169–172° C. Yield=86%.

Other corresponding 3-alkoxy compounds, such as the 3-ethoxy compound, are prepared in similar manner.

Example 18

3-METHOXY-SULPHAPYRAZINE (XIII) FROM (Ic)

26 g. of (Ic) are added to a solution of 5.75 g. of sodium dissolved in 150 ml. of methanol. The mixture is heated at 120° C. for 15 hours, then neutralized with acetic acid, concentrated and the residue is treated with aqueous acetic acid. The product (XIII) is filtered and dried.

M.P.=168–172° C. Yield=82%.

Other corresponding 3-alkoxy compounds, such as the 3-ethoxy compound, are prepared in similar manner.

The pharmacological data of some of the sulphapyrazines of the present invention are presented in the following tables.

Table 2, below, shows the minimum dose in mcg./ml., the MID (minimum inhibiting dose) of the compound (XIII) inhibiting the growth of the mentioned microorganisms, in comparison with those of sulpha-methoxy-pyridazine (SMP) and sulphapyrazine (SP).

The tests of the therapeutic activity were carried out on mice, infected by intraperitoneal inoculation of *Staph. pyogenes* or *D. pneumonia* or *Str. haemolyticus* or *Staph. aureus* suspensions. The compounds were administered either orally or subcutaneously at a dose of 12.5–100 mg./kg. and the treatment, which started immediately after the infection, continued for 5 days. The data are reported in the Tables 2, 3, 4, 5.

It has been found that the compound (XIII) is present in the blood at still therapeutically useful blood levels even after 48 hours. The toxicity of the product (XIII) in comparison with those of sulpha-methoxy-pyridazine (SMP) and sulphapyrazine (SP) is reported in Table 7. The compounds are employed in the form of their sodium salts when they are intravenously administered. The compounds are themselves used in a gummy suspension when they are orally administered.

The N₁-acyl-sulphapyrazines of the present invention, particularly the N₁-acetyl-3-methoxy-sulphapyrazine (XVI), have a highly desirable property in the fact that they are tasteless, while the corresponding sulphapyrazines are bitter. This property is very useful when the products are administered to animals or children.

The therapeutically active sulphonamides of the present invention may be used in the form of powders, tablets, pills or mixed in food or drinking water. The corresponding pharmaceutical compositions may also contain excipients and other ingredients and may be used singly or in combination with other sulphonamides or with antibiotics.

The sulphonamides are obviously also utilizable in other arts. For example, the primary p-amino group may be converted to a diazonium salt group, and coupled with common indicator or dye-forming coupling compounds, such as dimethyl benzene, phenol, naphthionic acid, or beta-naphthol. Procedures for carrying this out closely follow those described in prior patents and literature for making sulphonamide dyes of this class.

TABLE 2

| Micro-organisms | MID (mcg./ml.) | | |
|---|---|---|---|
| | XIII | SMP | SP |
| *Staph. aureus* 114 | 26 | 51 | 25 |
| Id. resist. to Neomycin | 24 | 48 | 50 |
| Id. resist. to Cathomycine | 100 | 23 | 50 |
| Id. resist. to Tetracycline | 195 | 55 | 200 |
| Id. resist. to Chlorotetracycline | 100 | 50 | 200 |
| Id. resist. to Oxytetracycline | 148 | 95 | 200 |
| Id. resist. to Crestomycin | 190 | 30 | 200 |
| Id. resist. to Streptomycin | 210 | 125 | 150 |
| Id. resist. to Penicillin | 53 | 28 | 250 |
| *Staph. aureus* 503 MB | 50 | 48 | 100 |
| *N. catarrhalis* | 100 | 150 | 100 |
| *G. tetragena* | 75 | 22 | |
| *S. eutea* | 80 | 25 | 150 |
| *S. faecalis* ATCC 8043 | 200 | 155 | 250 |
| *S. β-hemolyticus* | 200 | 55 | 200 |
| *B. subtilis* ATCC 6633 | 100 | 80 | 100 |
| *B. anthracis* | 75 | 11 | 130 |
| *Co simplex* | 180 | 50 | 220 |
| *Mycobacterium sp.* ATCC 607 | 50 | 25 | 70 |
| *E. coli* ATCC 9637 | 100 | 6.25 | 150 |
| *K. pneumoniae* | 100 | 70 | 150 |
| *S. paratyphi* B 248 K | 140 | 150 | 200 |
| *S. gallinarum* | 125 | 100 | 200 |
| *S. flexneri* var. Y | 130 | 50 | 150 |
| *P. morganii* | >250 | >250 | >250 |
| *P. vulgaris* | 150 | 50 | 200 |
| *P. aeruginosa* | 200 | 250 | 250 |
| *S. marcescens* | 75 | 13 | 150 |

TABLE 3

Infection: *D. pneumoniae* i.p.
Treatment: 50–10 mg./kg. orally (TD₅₀=therapeutic dose)

| | Compounds | | | | | | | |
|---|---|---|---|---|---|---|---|---|
| | Controls | XI | | XIII | | SMP | | SP | |
| Dose (mg./kg.) | | 50 | 100 | 50 | 100 | 50 | 100 | 50 | 100 |
| Death-rate 2nd day | 100 | 0 | 0 | 0 | 0 | 0 | 0 | 16 | 16 |
| Death-rate 10th day | | 83 | 66 | 66 | 16 | 75 | 56 | 92 | 83 |
| TD₅₀ (10 g.) mg./kg. | | 165 | | 62 | | 120 | | 410 | |

TABLE 4

Infection: *Staph. pyogenes* i.p.
Treatment: 25–100 mg./kg. orally (TD₅₀=therapeutic dose)

| | Compounds | | | | | | |
|---|---|---|---|---|---|---|---|
| | Controls | XIII | | | SMP | | | SP | | |
| Dose (mg./kg.) | | 25 | 50 | 100 | 25 | 50 | 100 | 25 | 50 | 100 |
| Death-rate 7th day | 100 | 75 | 33 | 0 | 83 | 50 | 8 | 100 | 92 | 58 |
| Death-rate 10th day | | 75 | 41 | 0 | 83 | 50 | 16 | | 100 | 66 |
| TD₅₀ (10 g.) mg./kg. | | 38 | | | 50 | | | 130 | | |

TABLE 5

Infection: *Str. haemolyticus* i.p.
Treatment: 50 mg./kg. orally

| | Compounds | | |
|---|---|---|---|
| | Controls | XIII | Sulpha-methoxy-pyridazine | Sulpha-pyrazine |
| Death-rate 5th day | 100 | 8.3 | 0 | 16 |
| Death-rate 10th day | | 25 | 53 | 66 |

TABLE 6

Infection: *Staph. aureus* (LT₅₀=average time of death in days)
Treatment: 12.5–50 mg./kg. subcutaneously (PD₅₀=dose protecting 50% of the mice treated for 7 days)

|  | Controls | XIII | | | SMP | | |
|---|---|---|---|---|---|---|---|
| Dose (mg./kg.) |  | 12.5 | 25 | 50 | 12.5 | 25 | 50 |
| Death-rate 7th day | 100 | 83 | 51 | 30 | 100 | 55 | 33 |
| LT₅₀ (days) |  | 4.4 | 7 | >15 | 4 | 6.2 | 15 |
| PD₅₀ (mg./kg.) |  |  | 28 |  |  | 27 |  |

TABLE 7

| Products | LD₅₀ (g. base/kg.) intravenously | LD₅₀ (g. base/kg.) orally |
|---|---|---|
| XIII | 1.410 | 2.164 |
| SMP | 0.812 | 1.802 |
| SP | 0.630 | 10.000 |

The second group of alkyl and dialkyl sulfamethoxypyrazines provided by the instant invention are pharmacologically more active than sulfapyrazine and are particularly useful in the therapy of bacterial infections caused by staphylococcus or streptococcus, pneumococcus or other microbial agents. These pyrazines are preferably prepared from the corresponding (5 or 6)-alkyl- and 5,6-dialkyl-3-chloro-2-aminopyrazines (XVII) through a series of reactions as schematically shown in Table 8.

boxyamidopyrazine (as described by Jones: J. Am. Chem. Soc. 71, 1949, p. 78) into 6-methyl-3-hydroxy-2-aminopyrazine, by Hoffmann reaction with the same procedure as described for isomer 5-methyl-derivative (F. L. Muehlmann and A. R. Day: J. Am. Chem. Soc. 78, 1956, p. 242) and from this, by chlorination with POCl₃, for some hours, at about 80–100° C., preferably at 100° C., XVIIc is obtained.

5-methyl-3-chloro-2-aminopyrazine (XVIIb) may be transformed into isomer 6-methyl-3-chloro-2-aminopyrazine (XVIIc) and likewise XVIIc may be converted into XVIIb, by a series of reactions as schematically shown in Table 9.

TABLE 9

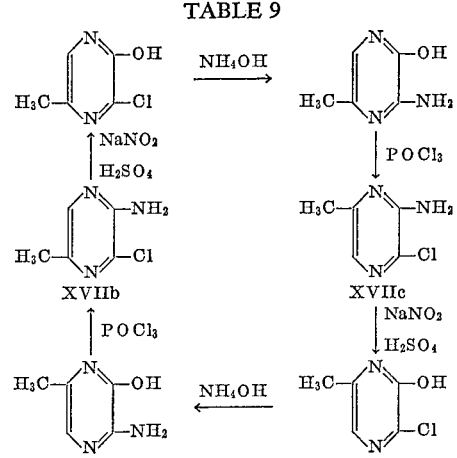

TABLE 8

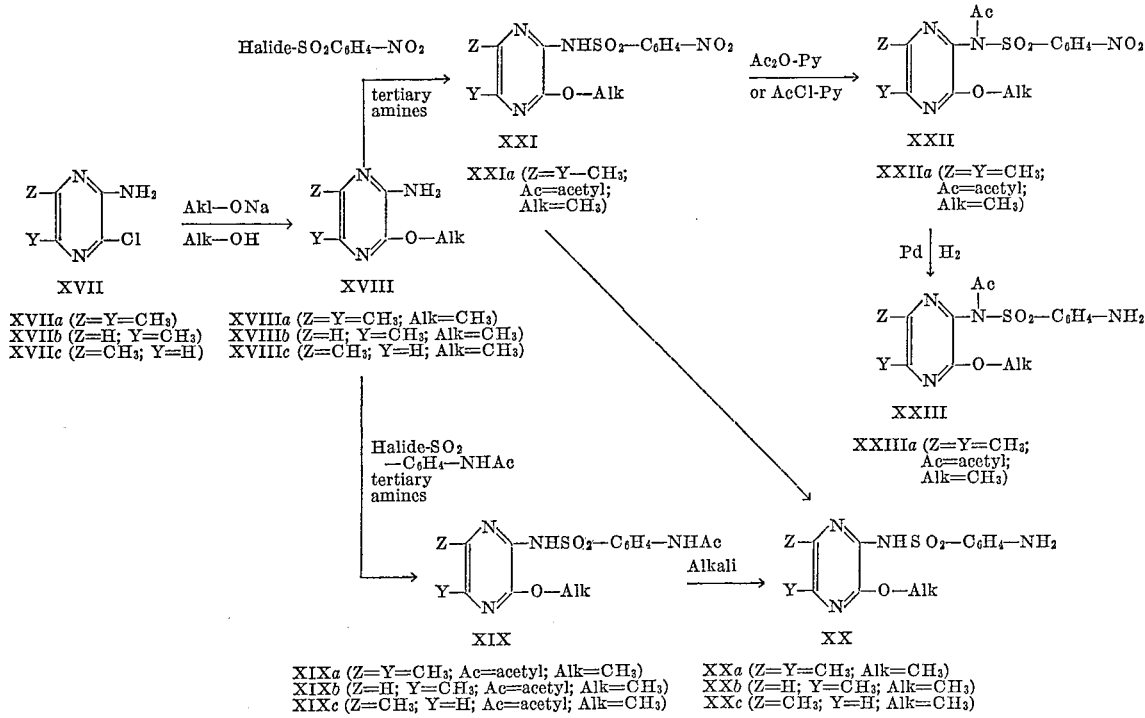

5,6-dimethyl-3-chloro-2-aminopyrazine (XVIIa) is well known in literature (E. Schipper and A. R. Day: J. Am. Chem. Soc. 74, 1952, p. 350).

5-methyl-3-chloro-2-aminopyrazine (XVIIb), which has not yet been reported as far as we know, has been prepared by chlorination with POCl₃, for some hours, at about 80–100° C., preferably at 100° C., of 5-methyl-3-hydroxy-2-aminopyrazine, prepared according to F. L. Muehlmann and A. R. Day: J. Am. Chem. Soc. 78, 1956, p. 242. 6-methyl-3-chloro-2-aminopyrazine (XVIIc), which has not yet been reported in literature, has been synthesized by transforming 6-methyl-3-hydroxy-2-carboxyamidopyrazine The above-mentioned conversion is carried out by converting the amino group into hydroxyl by diazotation with sodium nitrite and an inorganic acid, such as sulfuric or hydrochloric acid, then by transforming chlorine into an amino group using concentrated aqueous ammonia under pressure (110–130° C. for 10–15 hours) and finally by substituting hydroxyl with chlorine by chlorination with POCl₃, at about 80–100° C. for some hours.

Referring to Table 8, the (5 or 6)-alkyl and 5,6-dialkyl-3-chloro-2-amino-pyrazines (XVII) are transformed into the corresponding (5 or 6)-alkyl and 5,6-dialkyl-3-alkoxy-2-aminopyrazines (XVIII), by reacting an alkaline salt of an aliphatic alcohol having a low number of carbon atoms, in the corresponding alcohol, such as sodium or potassium ethylate or methylate or n-propylate, at its boiling point temperature or at more elevated temperatures under pressure for some hours. Using as an example sodium methylate in methyl alcohol, the reaction preferably carried out under pressure at 100–140° C. for 10–15 hours, gives 5,6-dimethyl-3-methoxy-2-amino-pyrazine (XVIIIa) from XVIIa, likewise 5-methyl-3-methoxy-2-amino-pyrazine (XVIIIb) from XVIIb and 6-methyl-3-methoxy-2-aminopyrazine (XVIIIc) from XVIIc.

The (5 or 6)-alkyl and 5,6-dialkyl-3-alkoxy-2-sulfanylamidopyrazines (XX) are prepared by condensing the amino pyrazines XVIII with a p-acylaminobenzene-sulfonyl halide, e.g. p-acetylaminobenzene-sulfonyl chloride, or a p-nitrobenzene-sulfonyl halide, e.g. p-nitrobenzenesulfonyl chloride, in the absence or presence of t.amines, such as pyridine or dimethylaniline in the mixture with an inert organic solvent such as acetone, and finally, when using p-acylaminobenzene-sulfonyl halide, by hydrolyzing the resulting p-acylamino-derivatives XIX with alkalies or with acids and, when using p-nitrobenzene-sulfonyl halide, by reducing the resulting p-nitro-derivatives XXII with hydrogen in the presence of suitable catalysts, such as 5–10% palladium over charcoal.

Following the above-mentioned equivalent procedures, the 5,6-dimethyl-3-methoxy-2-sulfapyrazine (XXa) may be obtained starting from XVIIIa, likewise the 5-methyl-3-methoxy-2-sulfapyrazine (XXb), starting from XVIIIb and the 6-methyl-3-methoxy-2-sulfapyrazine (XXc), starting from XVIIIc.

The (5 or 6)-alkyl and 5,6-dialkyl-3-methoxy-2($N_1$-acylsulfanylamido)-pyrazines (XXIII) may generally be prepared from the corresponding (5 or 6)-alkyl and 5,6-dialkyl - 3 - methoxy - 2 - (p - nitro - benzenesulfonamido)-pyrazine (XXI) by acylating the $N_1$-position with the anhydride or the chloride of a monocarboxylic aliphatic acid in the presence of t. amines, such as pyridine, and then reducing the nitro group of the resulting $N_1$-acyl-p-nitrobenzene-sulfonamide derivatives with hydrogen in the presence of suitable catalysts, such as 5–10% palladium over charcoal. As an example of the above, acylating the product XXI with acetic anhydride in the presence of pyridine and sequentially reducing the nitro group of the intermediate XXII with hydrogen in the presence of 10% palladium over charcoal in dioxane at room temperature and at atmospheric pressure yields the corresponding substituted $N_1$-acetylsulfapyrazines (XXIII).

Use of these products of our present invention is indicated in all infections caused by sulfonamide susceptible organisms, such as hemolitic Streptococci, Staphylococci, Pneumococci, Diplococci, etc. Particularly, the new sulfapyrazine derivatives of the present invention are indicated in catarrhal pharyngitis amygdalitis, erysipelas, bronchitis, bronchopneumonia, pneumonia, pleurisy, meningitis, otitis, pyelitis, cystitis, abscess, etc.

The new derivatives of sulfapyrazine and of $N_1$-acyl-sulfapyrazine of our invention may be administered orally as well as subcutaneously, in dosage units varying from 5 to 100 mg./kg.; the hematic levels were still therapeutically useful after 36–48 hours from starting of the treatment and no toxic effects were found. The new sulfa drugs are eliminated by renal excretion. Treatments with relatively high doses do not cause renal lesions.

The substituted $N_1$-acylsulfapyrazines of the instant invention are tasteless whereas the corresponding, non-acylated in the $N_1$-position, sulfapyrazines are bitter. This property is important when the products are to be administered to animals or to children.

The (5 or 6)-methyl and 5,6-dimethyl-3-methoxy-2-sulfapyrazines and the corresponding $N_1$-acyl derivatives of the present invention may be used pharmaceutically in the form of powders, tablets, pills, syrups, or mixed with animal foods. Said pharmaceutical compositions may also contain excipients or fillings, and the active ingredients may also be used in mixture with other sulfonamides or with antibiotics.

The following examples are given to illustrate, but not to limit, the present invention.

Example 19

5 - METHYL - 3 - CHLORO - 2 - AMINOPYRAZINE (XVIIb) FROM 5-METHYL-3-HYDROXY-2-AMINOPYRAZINE 5.8 g. of 5-methyl-3-hydroxy-2-aminopyrazine are refluxed with 30 cc. of phosphorus oxychloride for 4–5 hours. The mixture is concentrated to about the half of the starting volume and poured out slowly into 100 cc. of ice water while stirring. The small amount of the pitchy residue is filtered off. Concentrated ammonia is slowly added to the solution which is being cooled, to neutralize the solution. The neutralized solution is extracted with chloroform. After evaporation of the extract solvent a residue remains, which melts at 58–62° C. The yield is 4.2 g.—approximately 63%. The product after being purified by distillation at reduced pressure melts at 65° C.

Example 20

6-METHYL-3-CHLORO-2-AMINOPYRAZINE (XVIIc) FROM 6-METHYL-3-HYDROXY-2-CARBOXY-AMIDOPYRAZINE

The 6-methyl-3-hydroxy-2-aminopyrazine is prepared from 6 - methyl - 3 - hydroxy-2-carboxy-amidopyrazine by Hoffmann reaction according to the same procedure as described for isomer 5-methyl-derivative. Yield: 89.5%, M.P.=>330° C. with decomposition.

4 g. of 6-methyl-3-hydroxy-2-aminopyrazine are refluxed with 200 cc. of $POCl_3$ for 6.5 hours and concentrated to half volume at reduced pressure, then poured out into 100 g. of ice-water while stirring. The product is neutralized with concentrated aqueous ammonia by adding it slowly and by cooling, then extracted with chloroform. The chloroformic solvent of the extract is evaporated to yield 2.5 g. (approximately 55%) of yellowish crystals which melt at 112° C. By recrystallization from alcohol the M.P. rises to 113° C.

Example 21

6-METHYL-3-CHLORO-2-AMINOPYRAZINE (XVIIc) FROM 5-METHYL-3-CHLORO-2-AMINOPYRAZINE (XVIIb)

35 cc. of sulfuric acid are cooled to −5°/0° C. and 5.08 g. of sodium nitrite are added slowly while stirring. When nitrite addition is over, the product is heated to about 50° C. to complete solution (approximately 1–2 minutes). The solution is then again cooled to 0° C. A solution of 8.85 g. of 5-methyl-3-chloro-2-aminopyrazine (XVIIb) with 17 cc. of concentrated sulfuric acid, prepared by pulping in a mortar, is dropped from a separatory funnel into the cooled sulfuric solution while stirring for 15 minutes. When the addition is completed, stirring is continued for 15 minutes at 0° C., the cooling bath is then removed and the mixture kept for 45 minutes at room temperature. The mixture is then slowly poured, while stirring, into 400 g. of ice-water; the pH is adjusted to 4 with 40% NaOH while cooling, so that the temperature does not exceed the room temperature. The product is extracted with chloroform to give 6.3 g. (approximately 70%) of 5-methyl-3-chloro-2-hydroxypyrazine (M.P.=175° C.).

6 g. of 5-methyl-3-chloro-2-hydroxypyrazine thus prepared together with 50 cc. concentrated aqueous ammonia are sealed hermetically in a 100 cc. steel pressure vessel and heated to 125° C. for 15 hours. After cooling and evaporation of $NH_3$, the resulting solid is collected and washed with water several times to yield 7.4 g. (approximately 70%) of 6-methyl-3-hydroxy-2-aminopyrazine (M.P.=>330° C. with decomposition). Chlorination of the above product in the manner described in Example 20 yields the 6-methyl-3-chloro-2-aminopyrazine (XVIIc).

XVIIb can be obtained from 6-methyl-3-chloro-2-aminopyrazine (XVIIc), following the above steps.

Example 22

5,6-DIMETHYL-2-METHOXY-2-AMINOPYRAZINE (XVIIIa) FROM XVIIa 1.05 g. of sodium are dissolved in 115 cc. of anhydrous methanol. When reaction is over, the solution is poured into a steel pressure vessel (capacity 300 cc.) containing 7 g. of 5,6 - dimethyl - 3 - chloro - 2 - aminopyrazine (XVIIa). The vessel is sealed hermetically and immersed into an oil bath thermoregulated at 130° C. for 8 hours. After decoloring with carbon and filtering, the product is evaporated to dryness at reduced pressure. The crystalline residue is washed on a filter with water. Finally it is air-dried to give 3.5 g. (approximately 80%) of XVIIIa, melting at 118–120° C. Recrystallization from cyclohexane raises the M.P. to 122° C.

Example 23

5-METHYL-3-METHOXY-2-AMINOPYRAZINE (XVIIIb) FROM XVIIb 6 g. of 5-methyl-3-chloro-2-aminopyrazine (XVIIb) are hermetically sealed in a steel pressure tube containing a solution of 1.14 g. of sodium, approximately 20% excess, in 36 cc. of anhydrous methanol. The tube is immesred into an oil bath thermoregulated at 130° C. for 12 hours. The pH of the solution is adjusted to 8–8.5 with concentrated hydrochloric acid. The solution is then evaporated to dryness at reduced pressure. The residue is extracted with cool chloroform to yield 5.4 g. (approximately 93%) of XVIIIb melting at 73–75° C. The product melts at 77–78° C. when recrystallized from cyclohexane.

Example 24

6-METHYL-3-METHOXY-2-AMINOPYRAZINE (XVIIIc) FROM (XVIIc)

2 g. of 6-methyl-3-chloro-2-aminopyrazine (XVIIc) are hermetically sealed in a steel pressure vessel (capacity 50 cc.), containing a solution of 0.37 g. of Na in 25 cc. of methanol and heated to 135° C. for 15 hours. Decoloration with carbon and evaporation to dryness at reduced pressure follow. The residue is treated 4 times with 15–20 cc. of boiling cyclohexane with filtration each time. The solution is concentrated to a small volume at reduced pressure and then crystallized at cool temperature. The crystallized product is washed twice with cyclohexane to yield 1.5 g. (77%) of XVIIIc, melting at 96° C.

Example 25

5,6-DIMETHYL-3-METHOXY-2-(p-ACETAMINOBENZENE-SULFONAMIDO)-PYRAZINE (XIXa) FROM XVIIIa 4 g. of 5,6 - dimethyl - 3 - methoxy-2-aminopyrazine (XVIIIa) are dissolved in 30 cc. of anhydrous pyridine. The solution is cooled to about 0° C. and then 6.1 g. of p-acetaminobenzenesulfonyl chloride are slowly added over a period of 20 to 30 minutes. The mixture is left for 20 hours at room temperature, then for 15 hours at 50° C. The mixture is concentrated to a third of the starting volume, and then slowly poured into 150 cc. of ice-water while stirring. After half an hour it is filtered. The crystals on the filter are repeatedly washed with water to obtain 7.57 g. (83%) of XIXa melting at 230–232° C. By recrystallization from ethanol and decoloration with carbon, white crystals melting at 233° C. are obtained.

Example 26

5-METHYL-3-METHOXY-2-(p-ACETAMINOBENZENE-SULFONAMIDO)-PYRAZINE (XIXb) FROM XVIIIb 3.36 g. of 5 - methyl - 3 - methoxy - 2 - aminopyrazine (XVIIIb) are dissolved in 27 cc. of anhydrous pyridine. To the solution being cooled to about 0° C., 5.64 g. of p-acetaminobenzenesulfonyl chloride are added while stirring over a 20–30 minute period. The solution is left at room temperature for 20 hours, and then at 50° C. for 15 hours. The solution is concentrated to half the original volume and then slowly poured into 150 cc. of ice-water while stirring.

After 1 hour the crystallization is complete. The product is filtered and the solids thereof washed with water 2–3 times, to give 6.57 g. (approximately 81%) of XIXb melting at 236–240° C. The product is recrystallized from ethanol, decolorized with carbon and washed first with water and then with ethanol, giving a M.P. of 238° C.

Example 27

6-METHYL-3-METHOXY-2-(p-ACETAMINOBENZENE-SULFONAMIDO)-PYRAZINE (XIXc) FROM XVIIIc 1.4 g. of 6 - methyl - 3 - methoxy - 2 - aminopyrazine (XVIIIc) in 13 cc. of anhydrous pyridine are treated with 3.44 g. of p-acetaminobenzenesulfonyl chloride according to the procedure of Example 26. 3.2 g. (93%) of XIXc melting at 215° C. are obtained. The M.P. rises to 221° C. by recrystallization from ethanol.

Example 28

5,6,DIMETHYL-3-METHOXY-2-SULFAPYRAZINE (XXa) FROM XIXa 3 g. of 5,6 - dimethyl - 3 - methoxy - 2 - (p-acetaminobenzene-sulfonamido)-pyrazine (XIXa) are refluxed with 16 cc. of 2 N NaOH for 1 hour. After cooling, 2 N HCl is slowly added while stirring until the pH is about 6. The separated product is filtered, washed several times with water to yield 2.3 g. (87.12%) of XXa melting at 180° C. By recrystallization from ethanol, and decoloration with carbon, followed by washing twice with water and twice with ethanol, the M.P. rises to 192–193° C.

Example 29

5,6-DIMETHYL-3-METHOXY-2-(p-NITROBENZENE-SULFONAMIDO)-PYRAZINE (XXIa) FROM XVIIIa 19.2 g. of p-nitrobenzene sulfonyl chloride are slowly added for 30 minutes to a solution of 13.3 g. of 5,6-dimethyl-3-methoxy-2-aminopyrazine (XVIIIa) which have been dissolved in 130 cc. of anhydrous pyridine, and cooled to 0° C. The mixture is kept at room temperature with stirring for 24 hours, then heated to 60° C. for 8 hours. The reaction mixture is concentrated under vacuum to a half of the starting volume and then slowly poured into 300 g. of ice-water while stirring. The product XXIa is filtered and washed with water (3.43 g.: yield 81%). The pure product melts at 192° C. (crystallized from alcohol).

Example 30

5,6-DIMETHYL-3-METHOXY-2-SULFAPYRAZINE (XXa) FROM XXIa

The product XXIa is dissolved in dioxane and then hydrogenated at room temperature and atmospheric pressure in the presence of 10% palladium over charcoal. After several hours, hydrogen absorption is complete. After filtering off the catalyst, the filtrate is evaporated to dryness. Crystallization of the residue from ethanol yields XXa, melting at 192–193° C.

Example 31

5-METHYL-3-METHOXY-2-SULFAPYRAZINE (XXb) FROM XIXb

A mixture of crude XIXb (2.7 g.) and of 2 N NaOH (15 cc.) is boiled for 1 hour. After cooling, 2 N HCl is added slowly and while stirring, to reach a pH of 6–6.5. The solid obtained is filtered and washed with water. Yield: 2.25 g. (approximately 95%) of XXb melting at 220–227° C. The product is recrystallized from ethanol, decolorized with carbon and washed 2–3 times with water, then with ethanol; M.P. rises to 227–232° C.

The same product (XXb) may also be prepared from XVIIIb through the intermediate XXIb following the procedure described for the analogous 5,6-dimethyl in Examples 29 and 30.

17

Example 32
6-METHYL-3-METHOXY-2-SULFAPYRAZINE (XXc) FROM XIXc

Deacylation is carried out on compound XIXc by refluxing it in 2 N NaOH for 1 hour and 20 minutes following the procedure of Example 31. 2 g. of the starting product yield 1.6 g. (92%) of product XXc melting at 168–169° C. By recrystallization from water the M.P. rises to 169.5° C.

The same product XXc may be obtained from XVIIIc also through the intermediate XXIc, following the procedure described for the analogous 5,6-dimethyl in Examples 29 and 30.

Example 33
5,6-DIMETHYL - 3-METHOXY-2-($N^1$-ACETYL-p-NITROBENZENESULFONAMIDO)-PYRAZINE (XXIIa FROM XXIa)

10 g. of XXIa are added to a mixture of 20 cc. pyridine together with 9 cc. of acetic anhydride. The solution is kept at 95° C. for 45 minutes and afterwards poured into 200 g. of ice-water while stirring. The product is filtered and washed with water. Yield: 11.2 g. (100%) of XXIIa which melts at 180–185° C. The pure product melts at 186° C. when recrystallized from alcohol.

The same procedure may be followed to obtain 5-methyl-3-methoxy-2-($N^1$-acetyl - p - nitrobenzenesulfonamido)-pyrazine from 5-methyl-3-methoxy-2-(p-nitrobenzenesulfonamido)-pyrazine and 6 - methyl-3-methoxy-2-($N^1$-acetyl-p-nitrobenzensulfonamido) - pyrazine from 6-methyl - 3 - methoxy - 2 - (p - nitrobenzenesulfonamido)-pyrazine.

Example 34
5,6 - DIMETHYL - 3 - METHOXY - 2-($N^1$-ACETYL-SULFONAMIDO)-PYRAZINE (XXIIIa) FROM XXIIa 8.5 g. of XXIIa, dissolved in 425 cc. of dioxane, are hydrogenated at room temperature and atmospheric pressure in the presence of 10% palladium over charcoal. Hydrogen absorption is complete after 24 hours. The catalyst is removed by filtration, and the filtrate evaporated to dryness under vacuum. Residue crystallizes from methanol. Yield: 7 g. of XXIIIa melting at 223° C.

By following the above procedure, 5-methyl-3-methoxy-2-($N^1$-acetyl-sulfonamido)-pyrazine is obtained from 5-methyl - 3 - methoxy - 2 - ($N^1$ - acetyl - p - nitrobenzenesulfonamido)-pyrazine, and 6-methyl-3-methoxy-2-($N^1$-acetyl-sulfonamido)-pyrazine is obtained from 6-methyl-3 - methoxy - 2 - ($N^1$ - acetyl - p - nitrobenzenesulfonamido)-pyrazine.

We claim:
1. A compound of the formula

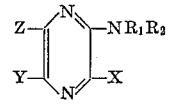

in which X is a member selected from the group consisting of $OCH_3$ and $OC_2H_5$; Y is a member selected from the group consisting of H, Br and lower alkyl; Z is a member selected from the group consisting of H and lower alkyl, when Y is Br, Z is H; $R_1$ is a member selected from the group consisting of H and lower alkanoyl; and $R_2$ is a member of the group consisting of

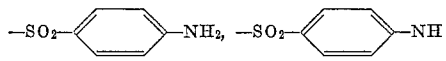

lower alkanoyl and

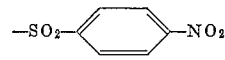

2. 2 - (p - acetylamino - benzene - sulfonamido) - 3 - methoxy-5-bromo-pyrazine.
3. 2-sulfanilamido-3-methoxy-5-bromo-pyrazine.
4. 2-(p-acetylamino-benzene - sulfonamido) - 3 - methoxy-pyrazine.
5. 2-sulfanilamido-3-methoxy-pyrazine.
6. 2-(p-nitrobenzene-sulfonamido)-3-methoxy-pyrazine.
7. 2-sulfanilamido-3-ethoxy-pyrazine.
8. 2-sulfanilamido-3-lower alkoxy-pyrazine.
9. 2-($N_1$-acetyl-p-nitrobenzene-sulfonamido) - 3 - methoxy-pyrazine.
10. 2-($N_1$-acetyl-sulfanilamido)-3-methoxy-pyrazine.
11. 5,6-dimethyl-3-methoxy-2-sulfapyrazine.
12. 5,6-dimethyl-3-methoxy - 2 - ($N^1$-acetyl - sulfonamido)-pyrazine.
13. 5-methyl-3-methoxy-2-sulfapyrazine.
14. 5-methyl - 3 - methoxy - 2 - ($N^1$ - acetyl - sulfonamido)-pyrazine.
15. 6-methyl-3-methoxy-2-sulfapyrazine.
16. 6-methyl-3-methoxy-2-($N^1$ - acetyl - sulfonamido)-pyrazine.

No references cited.